United States Patent [19]

Molski

[11] 4,281,958

[45] Aug. 4, 1981

[54] WHEEL CHAIR HOIST ASSEMBLY FOR VEHICLES

[76] Inventor: Bernard E. Molski, 5001 Coventry, Royal Oak, Mich. 48073

[21] Appl. No.: 97,688

[22] Filed: Dec. 13, 1979

[51] Int. Cl.$^3$ .............................................. B60P 1/02

[52] U.S. Cl. .................................... 414/542; 414/921

[58] Field of Search ........................ 414/462, 542, 921; 212/71, 133, 134

[56] References Cited

U.S. PATENT DOCUMENTS

| | | | |
|---|---|---|---|
| 2,835,285 | 5/1958 | Gardner | 308/6 R X |
| 3,656,637 | 4/1972 | Lynn et al. | 414/542 |
| 3,843,215 | 10/1974 | McClosky | 308/6 R |
| 3,957,164 | 5/1976 | Brown | 414/921 X |
| 4,076,347 | 2/1978 | Meek | 308/238 |

FOREIGN PATENT DOCUMENTS

| | | | |
|---|---|---|---|
| 1427838 | 3/1976 | United Kingdom | 414/921 |

*Primary Examiner*—Robert W. Saifer

*Attorney, Agent, or Firm*—Cullen, Sloman, Cantor, Grauer, Scott & Rutherford

[57] ABSTRACT

A wheel chair hoist assembly for a vehicle having a body and a roof comprising a transverse support bar within the body secured to the roof. A mount tube with a depending winch mount bracket is reciprocably and slidably supported upon the support bar. A tubular boom, normally positioned within the body, is parallel to and secured to the mount tube and adapted for sliding projection outwardly of the body. A power winch having a drum is supported on the bracket and includes a cable around the drum guidably projected through the boom with its free end mounting a hook adapted to supportably engage a collapsed wheel chair. A manual switch is connected to a power source to energize the winch to elevate the wheel chair, and the boom is manually projected successively inward transferring the wheel chair into the body.

10 Claims, 5 Drawing Figures

FIG. 1
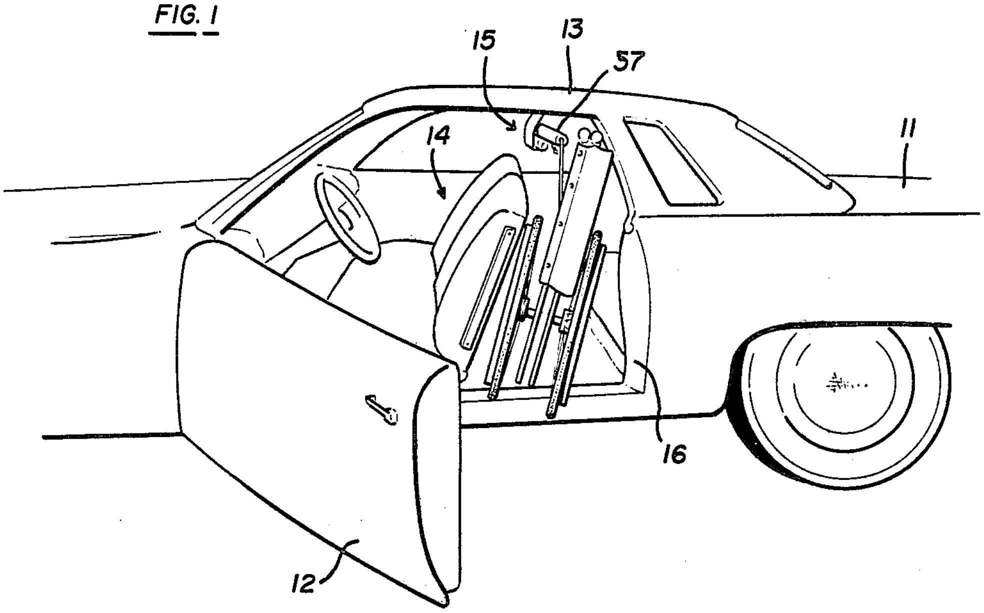
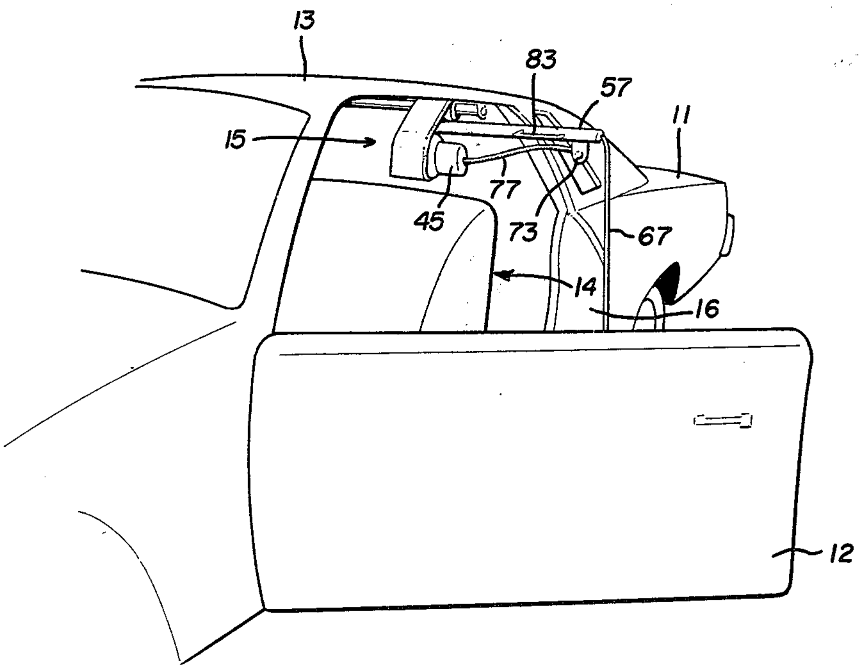
FIG. 5

WHEEL CHAIR HOIST ASSEMBLY FOR VEHICLES

BACKGROUND OF THE INVENTION

Heretofore, it is known to provide for a vehicle a transversely mounted boom carrying a winch mechanism for lifting a wheel chair and its occupant and transporting it into the vehicle or for only transporting the individual into the vehicle. Other devices have been employed on vehicles which involve a winch for lifting a load and for transporting it into a vehicle such as a railway car or for otherwise loading objects into a vehicle.

Examples of such prior art efforts are shown in the following U.S. Pat. Nos.:

3,957,164
3,656,637
2,793,768
2,522,267
2,191,912
1,703,153
1,614,769

SUMMARY OF THE INVENTION

It is a feature of the present invention to provide an improved and simplified wheel chair hoist assembly for a vehicle and wherein upon a support within the vehicle there is slidably mounted a tubular boom and a connected power winch having a cable threaded through the boom and mounting a hook for engaging and elevating a collapsed wheel chair and successively the boom is manually projected into the vehicle body transporting the wheel chair thereinto.

It is another feature to provide an improved wheel chair hoist assembly for a vehicle having a body, a front seat, a battery and a roof and wherein a support bar is mounted within the body and secured to the roof extending transversely thereof. A tubular boom is slidably mounted upon the bar and is connected to a bracket which supports a power operated winch whose cable is threaded through the boom and mounts a hook adapter for connection to a collapsed wheel chair. A manually operable switch control interconnects the winch assembly and the battery so that the winch will lift the collapsed wheel chair a predetermined height and the boom thereafter may be successfully slid manually into the vehicle body carrying the wheel chair thereinto.

It is a further feature to provide an improved wheel chair hoist assembly, particularly adapted for vehicles of the two door type, and wherein a transverse boom is normally positioned within the vehicle body, mounts a power operated winch and includes a cable projecting from the winch and through the boom mounting a hook for engagement with a collapsed wheel chair by which the wheel chair may be elevated by the winch to the proper height and the boom thereafter manually projected back into the vehicle body carrying the wheel chair therein.

It is a still further feature to provide a wheel chair hoist assembly which may be easily attached to a vehicle for nesting of the support and boom within the vehicle and wherein the boom is adapted for manual projection outwardly of the vehicle so that the cable depending therefrom can be clamped to a collapsed wheel chair and on operation of the winch the chair is elevated and successively manually projected into the vehicle body.

These and other objects will be seen from the following specification and claims in conjunction with the appended drawings.

THE DRAWINGS

FIG. 1 is a perspective view of a vehicle, fragmentarily shown, to which the present wheel chair hoist assembly has been connected and illustrating a collapsed wheel chair supported therefrom.

FIG. 5 is a fragmentary view illustrating the manual projection of the boom outwardly of the vehicle body.

It will be understood that the above drawings illustrate merely a preferred embodiment of the invention, and that other embodiments are contemplated within the scope of the claims hereinafter set forth.

DETAILED DESCRIPTION OF AN EMBODIMENT OF THE INVENTION

Figure 2:
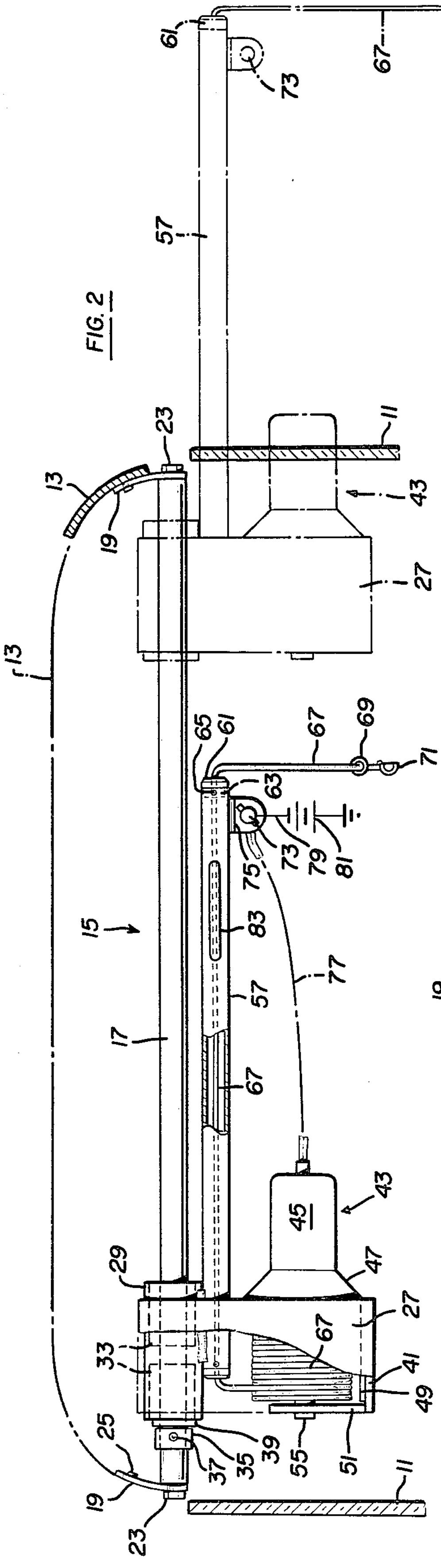
FIG. 2 is a fragmentary side elevational view of the present wheel chair hoist assembly, on an increased scale.

Referring to the drawings and particularly to FIG. 1, a vehicle body is shown at 11 including a front door 12 on the driver's side of the vehicle body 11, roof 13, a front seat 14, and a conventional twelve volt battery 81 as schematically shown in FIG. 2. The driver's side front door 12, shown in an open position in FIGS. 1 and 5, normally closes an access opening 16 in the driver's side of the passenger car vehicle. The front seat 14 may hold two or three persons including the driver who is located next to the front door 12.

The present wheel chair hoist assembly generally indicated at 15, FIG. 2, includes a support bar 17, round in cross section, which is arranged within the body 11 rearwardly of the front seat 14 and extends transversely of the length of the body from one side of the interior of the body 11 to the other side as shown by the solid lines in FIG. 2. A pair of upwardly and inwardly curved hanger brackets 19 having a series of apertures 21 therethrough at their one ends overlie the respective ends of the support bar 17 and are secured thereto by the bolts 23.

Fasteners 25 are selectively projected through the bracket apertures 21 and are connected to the roof 13 fragmentarily shown in FIG. 2, to fixedly mount the support bar 17.

Elongated mount tube 29 is reciprocably positioned over the support bar 17 and retains therein a pair of spaced aligned ball bushings 33 for cooperative sliding registry with the support bar 17. Stop collar 35 is mounted adjacent one end of the support bar 17 and is secured thereto by set screws 37. Rubber cushion bumper 39 is mounted upon one end of the mount tube 29 and cooperates and registers with the stop collar 35 when the mount tube 29 has been projected inwardly to the position shown in FIG. 2.

Figure 4:
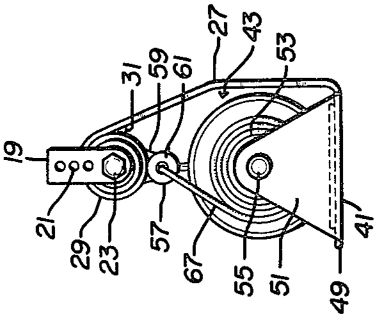
FIG. 4 is a left end elevational view thereof.

A winch mount bracket 27, generally of L shape, FIG. 4, at its upper free end is secured to mount tube 29 as by the welds 31 and at its lower end has a transverse base 41 mounting and supporting and securing the winch assembly 43.

In the illustrative embodiment, the winch assembly 43 includes an electric reversible motor 45, twelve volt DC, having motor mount bracket 47, the connected support 49 and at the end thereof the upright drum support and journal 51. The journal 51 is generally parallel to and spaced from motor mount bracket 47. The motor 45 has a drive shaft 55 which has keyed thereon the drum 53, FIG. 4, for rotation upon an axis which is parallel to the support bar 17.

Elongated tubular boom 57 normally nested within the body 11, is parallel to and spaced below the support bar 17 and is secured to the outer surface of the mount tube 29 as by the welds 59. The boom 57 extends transversely of the length of vehicle body 11.

One end of the boom 57 is nested within the winch mount bracket 27. The boom extends outwardly of the bracket 27 and longitudinally outward of the mount tube 29 and is spaced below and parallel to the support bar 17.

Apertured nylon bushings 61 are arranged at opposite ends of the boom 57 and include bosses 63 which project into the ends of the boom 57 and are secured therein by the set screws 65.

Flexible cable 67 is secured to and wound around the drum 53 and is longitudinally and slidably projected through the boom 57. The cable 67 extends through the bushings 61, with the depending end of the cable 67 swivelly mounting at 69 a hook or clamp 71.

A manually operable remote control switch assembly 73 is mounted upon an outer end portion of the boom 57 and is secured thereto at 75, FIG. 2. A power harness including a pair of leads 77 interconnects the switch assembly 73 with the reversible motor 45. Additional power leads 79 interconnect the switch assembly 73 to the conventional vehicle twelve volt DC battery 81, FIG. 2.

Figure 3:
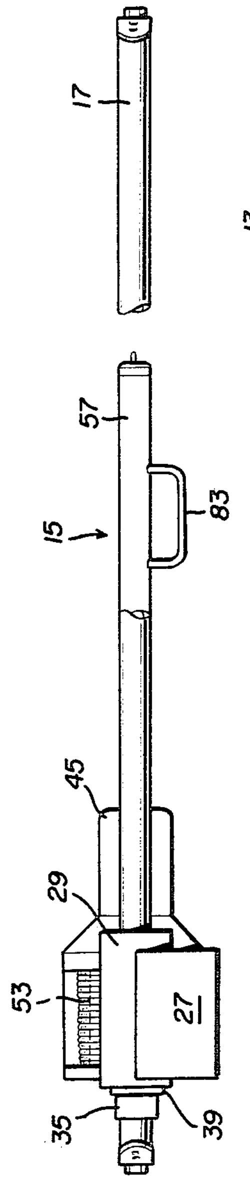
FIG. 3 is a top plan view thereof.

Elongated laterally arranged U-shaped handle 83 is secured to and projects from an outer end portion of boom 57 as in FIGS. 2 and 3 and provides a means by which the boom 11 may be manually projected outwardly of the vehicle, with the door 12 open, for connecting the cable 67 and hook 71 to a collapsed wheel chair, FIG. 5. In operation, upon manual actuation of the switch assembly 73, the motor 45 and associated power winch assembly 43 are activated rotating the drum 53 and winding the cable 67 thereon. This retracts the cable 67 so that the cable 67 elevates the wheel chair to the desired loading position, as shown in FIG. 1.

By release of the remote control switch assembly 73 the motor 45 is stopped. Thereafter using the handle 83, the boom 57 and the supported elevated collapsed wheel chair are manually projected back into the interior of the vehicle. The boom 57 is suspended from the mount tube 29 which is slidably supported upon the support 17. Inward movement of the boom 57 and connected mount tube 29 is limited by the cushion stop 39 engaging the stop collar 35.

The present power winch assembly shown at 43, FIGS. 2 and 4, is readily available on the market and is supplied by the Dayton Company of Dayton, Ohio. A characteristic of the power winch assembly 43 employed is that it includes simple differential gearing, is fully reversible and has the capability of stopping and locking instantly. There is incorporated within the switch assembly 73 a three way, load-off-unload switch. After the switch is energized, returning the switch to an off position stops and locks the cable 67 instantly.

The present wheel chair hoist assembly is particularly useful with two door vehicles and wherein the boom 57 normally stored completely within the vehicle body 11 may be manually projected by its handle 83 so as to extend outwardly of the body 11 through the access opening 16 located at the driver's side of the vehicle as shown fragmentarily in FIG. 5.

The positioning and locating of the support bar 17 for the present hoist assembly is rearwardly of the vehicle front seat 14, and the boom 57 is arranged so as to be manually projectible outwardly of the vehicle body 11 from the driver's side, FIG. 5.

With the boom 57 manually projected outwardly to the position shown in FIG. 5, the remote control switch assembly 73 can be activated to lower the cable 67 so that the hook 71 is adapted to grip around a part of the collapsed wheel chair. Thereafter the switch assembly 73 is activated so that the winch assembly 43 winds up the cable 67 and elevates the collapsed wheel chair to the position shown in FIG. 1.

Successively the user grasps the handle 83 and manually projects the boom 57 and the suspended collapsed wheel chair inwardly into the interior of the vehicle body 11 in the manner shown in FIG. 1.

This provides a very convenient mechanism by which an individual may conveniently elevate the wheel chair after it has been manually collapsed and thereafter easily slide the collapsed wheel chair into the veicle body for transport therewith. The reverse is true at a destination with the door 12 open the boom 57 may be manually slid outward which carries therewith the elevated collapsed wheel chair. The winch assembly 43 may then be activated by remote control switch 73, and the collapsed wheel chair is lowered to the pavement and stopped. With hook 71 disconnected, the boom 57 may be manually slid inwardly for storage unloaded within the vehicle body 11.

The present wheel chair hoist assembly provides a convenient means to overcome the problem heretofore of manually elevating a collapsed wheel chair so that it can be projected into a vehicle normally behind the driver's seat. Heretofore there were difficulties because of the bulky nature of the collapsed wheel chair and because the floor in the vehicle is normally not flat. For some people it is difficult or impossible to lift the wheel chair and project it into the vehicle. Therefore, the present wheel chair hoist assembly 15 solves this particular problem in a simple and convenient manner.

Having described my invention, reference should now be had to the following claims.

I claim:

1. A wheel chair hoist assembly adapted for mounting within the interior of a vehicle having a body provided with an access opening on the driver's side of the vehicle, a front seat adjacent the access opening, with the access opening controlled by a door which may be opened to permit a person to enter the body and to use the wheel chair hoist assembly and the front seat, a battery and a roof comprising:

an elongated support bar located entirely within the body rearwardly of the seat extending transversely of the length of the body;

hanger brackets connected to the ends of said support bar and secured to the roof adjacent the opposite sides of the body;

a mount tube slidably supported upon said support bar;

a winch mount bracket fixedly secured to and depending from said mount tube;

a boom located parallel to and spaced below said support bar at one end secured to said mount tube, with its other end projecting laterally of said mount tube and said winch mount bracket; said boom having a length less than the length of said support bar;

said boom being normally positioned within the body;

said boom being manually slidable along said support bar for projecting said other end of said boom laterally outward of the vehicle body through the access opening on the driver's side of the vehicle;

a power operated winch assembly secured upon said winch mount bracket and including a reversible rotatable drum;

a cable at one end secured to and mounted around said drum, longitudinally and guidably projected through the interior of said boom, with its free other end depending from said other end of said boom;

a hook mounted upon said other end of said cable adapted to supportably engage a collapsed wheel chair;

and a manually operable control switch means mounted on said boom interconnecting said winch assembly and battery;

said winch assembly adapted to lift the collapsed wheel chair a predetermined distance;

said boom being successively slidable manually to project the collapsed wheel chair into the body for storage in the vehicle body behind the front seat.

2. In the wheel chair hoist assembly of claim 1, said hanger brackets having a series of spaced apertures, the securing of the brackets to said roof including a plurality of fasteners selectively located and extending through said brackets.

3. In the wheel chair hoist assembly of claim 1, the supporting of said support mount tube upon said bar including a pair of longitudinally spaced ball bushings secured within said mount tube receiving said support bar.

4. In the wheel chair hoist assembly of claim 1, a stop collar mounted adjacent one end of said support bar cooperatively engageable with said mount tube when retracted.

5. In the vehicle chair hoist assembly of claim 4, a resilient cushion bumper mounted upon one end of said mount tube and engageable with said stop collar.

6. In the wheel chair hoist assembly of claim 1, said winch mount bracket being of L shape, including a horizontally disposed base supporting and anchoring said winch assembly.

7. In the wheel chair hoist assembly of claim 1, a handle mounted upon said boom adjacent one end thereof to facilitate selective manual reciprocal adjustments of said boom along the length of said bar.

8. In the wheel chair hoist assembly of claim 1, said power operated winch assembly including a reversible electric motor having a drive shaft mounting said drum;

the axis of said drive shaft and drum being parallel to and spaced below said boom.

9. In the wheel chair hoist assembly of claim 1, the guided projection of said cable through said boom including a pair of spaced apertured bushings upon the opposite ends of said boom.

10. In the wheel chair hoist assembly of claim 1, said winch assembly including a reversible electric motor;

said switch control means including a manually operable switch mounted upon said boom to start, stop and reverse said drum;

and electric power leads interconnecting said switch with said motor and battery.

* * * * *